United States Patent
Gamboa

[11] Patent Number: 6,107,710
[45] Date of Patent: Aug. 22, 2000

[54] ALTERNATOR RECTIFIER ASSEMBLY CONNECTION CONVERSION MEANS AND METHOD

[76] Inventor: Jose Gamboa, 305 E. Ligustrum Blvd., Robstown, Tex. 78380

[21] Appl. No.: 09/047,624

[22] Filed: Mar. 23, 1998

Related U.S. Application Data

[63] Continuation-in-part of application No. 08/600,069, Feb. 12, 1996, abandoned.

[51] Int. Cl.[7] .............................. H02K 11/00; H02K 5/22
[52] U.S. Cl. ...................... 310/67 R; 310/68 D; 363/145
[58] Field of Search ..................................... 310/68 R, 71, 310/68 D; 363/144, 145, 146, 141, 690, 714; 439/722, 620, 893

[56] References Cited

U.S. PATENT DOCUMENTS

| | | | |
|---|---|---|---|
| 5,453,648 | 9/1995 | Bradfield | 310/71 |
| 5,640,062 | 6/1997 | Yockey | 310/68 D |
| 5,659,212 | 8/1997 | DePetris | 310/68 D |
| 5,677,616 | 10/1997 | Ooiwa | 310/68 R |
| 5,821,674 | 10/1998 | Weiner | 310/68 D |

FOREIGN PATENT DOCUMENTS

| | | |
|---|---|---|
| 0562909 | 3/1993 | European Pat. Off. . |
| 05219703 | 8/1993 | Japan . |

*Primary Examiner*—Nestor Ramirez
*Assistant Examiner*—Tran N Nguyen
*Attorney, Agent, or Firm*—Daniel Vera

[57] ABSTRACT

Means are disclosed which allow certain automobile alternators to be converted so that their electrical hook ups are reverted to an older more efficacious terminal connection style thereby enabling the use of older alternator frames when rebuilding or remanufacturing these alternators. Essentially a bayonett style male/female connector assembly is replaced with a bolt and nut and eyelet style of connection means.

2 Claims, 3 Drawing Sheets

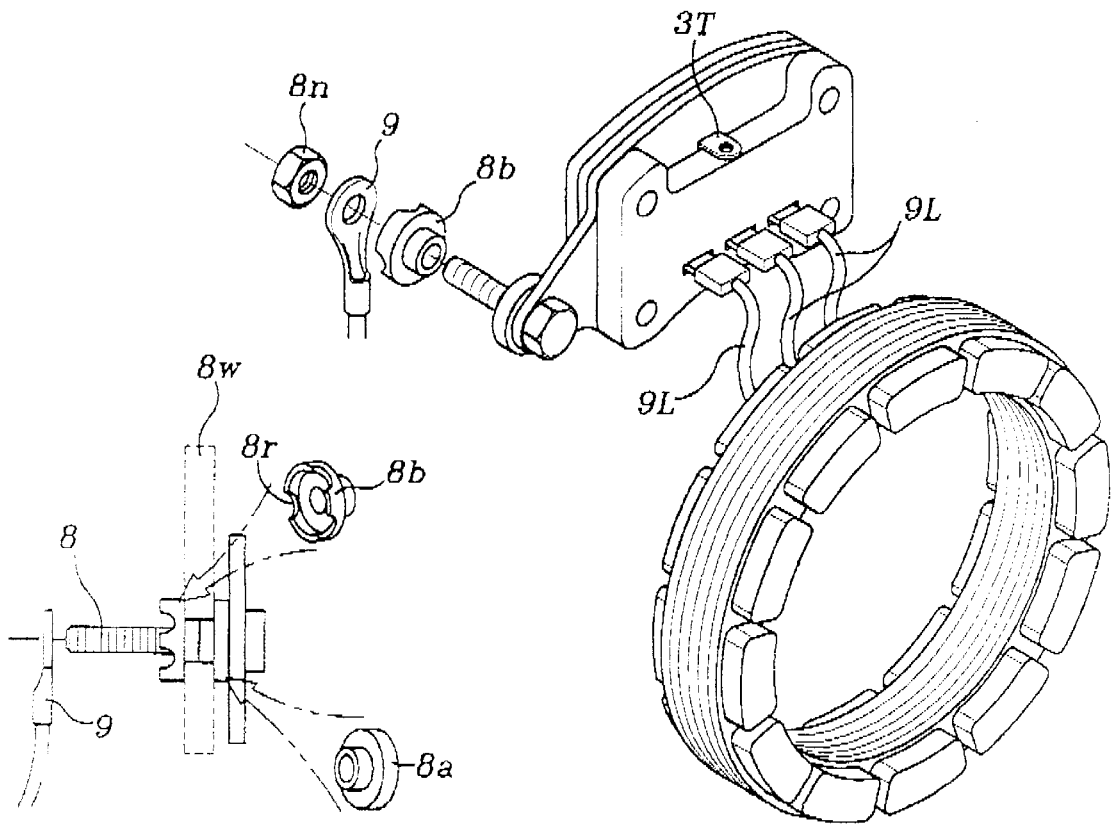
FIG. 6
FIG. 5
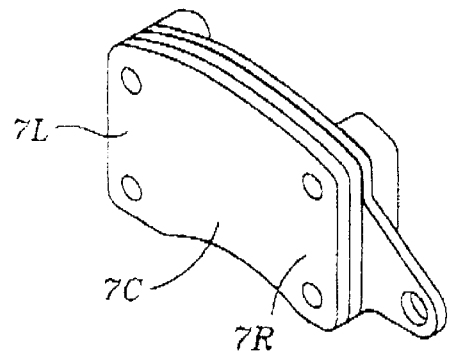
FIG. 8
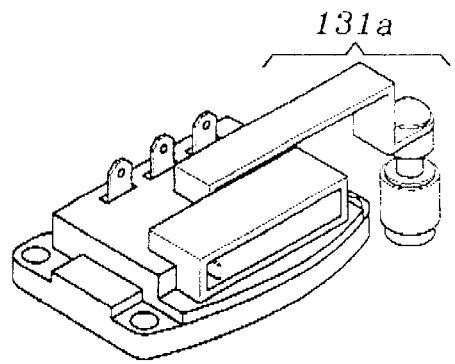
FIG. 7
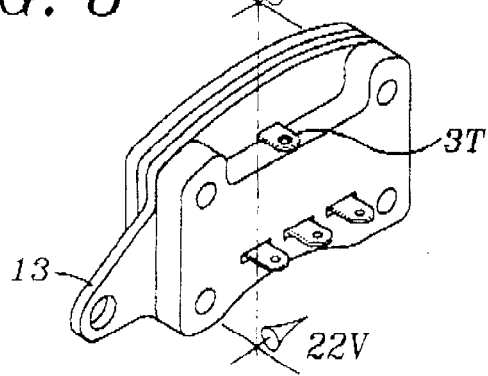

ALTERNATOR RECTIFIER ASSEMBLY CONNECTION CONVERSION MEANS AND METHOD

This is a continuation-in-part of application Ser. No. 08/600,069 filed Feb. 12, 1996, now abandoned.

BACKGROUND OF THE INVENTION (1) Field of invention

This invention relates to articles of manufacture specifically means by which automobile alternators of a certain type may be converted or rebuilt to improve their reliability and the method of effecting the conversion. These types of generators are known in the automotive generator repair industry as Ford's IAR (Integral Alternator/Regulator) style of generator and will be referred to below as old style alternators.

(2) Background Information

Automobile alternators, referred to below as alternators or generators, such as those found on the following Ford Motor Co. automobile products: 1985–90 Crown Victoria, Escort, Mustang, Tempo, Thunderbird; 1986–90 Taurus Lincoln Mercury: 1885–87 Lynx; 1985–90 Continental, Couger, Grand Marquis, Mark VII; 1986–90 Sable; 1987–89 Tracer Light Trucks: 1985–90 Bronco, Econoline, all of which have an internally affixed rectifier which is generally configured as per Original Equipment Manufacturer no.: E6DZ-10304A GY-1360, often fail due to poor connection at the generator-to-wiring harness connector or service connection. Typically 3 wires, terminating in bayonet connectors, of the wire harness are grouped together into a multiple bayonet connector housing which is used to connect the wires to the rectifier. This poor connection which may be caused by normal wear and tear produces heat in excess of what can be handled by either or both the generator and wiring harness; often resulting in burn out of the rectifier which is built into the generator and is immediately connected to the points at which the wiring harness connects to the generator. If the generator and/or the wiring harness is rebuilt or replaced there is a significant risk that the poor connection problem will not be solved and damage to the new generator may result in a repeat repair. Until the high resistance at the point of connection between the wiring harness and the rectifier on the generator is corrected, excessive heat will continue to be produced at that point, risking repeat damage. Hereafter the point at which the wiring harness terminates in a connector which connects to the rectifier on the generator will be referred to as wire harness terminal, and the point on the rectifier to which the wire harness terminal is connected will be referred to as the rectifier terminal. The point at which the rectifier is connected to the field windings of the stator will be called the field terminals.

There exists a significant market for means to effect an efficacious repair of old style rectifier damaged generators.

DESCRIPTION OF THE PRIOR ART

Several approaches to solving the problem of damaged generator repair due to the above mentioned cause are known: the generator may be replaced, the wiring harness may be replaced, the generator may be rebuilt by replacing the rectifier assembly or a new generator called a Ford 3G Series generator may be installed which has been redesigned to be connected to the wiring harness at high heat producing points via old style bolt and eyelet terminals. The problem with this last solution is that the generator repair industry uses old generator frames or cores to remanufacture and rebuild generators and there is currently a much greater supply of old style cores than there is 3G cores for the generator repair industry to repair and market.

SUMMARY OF THE INVENTION

The principle object of the present invention is to provide a product and method of installing the product to produce a: cheap efficacious repair means of old style generators with potentially poor electrical service connection means. A secondary disclosure and object of this invention is to provide a kit for the cheap and effective precautionary repair or post damage repair of old style generators. Still another function of the invention is to provide a method for producing and installing the kit referred to above. Further objects appear as the description proceeds.

Summarily the invention discloses the removal of an old style generator's rectifier assembly which has a multiple bayonet style terminal and replacing it with an assembly which is designed to more capably handle the current which runs through the rectifier assembly via individual bolt and eyelet style terminals. Thus the invention is the reconfiguration of the rectifier assembly which comprises a negative current grounding plate, an adjacent positive plate, having an eyelet for receiving a battery terminal bolt, insulated from the grounding plate by a thin gasket, diodes, a stator connecting post, an internal terminal block, a positive battery output post terminal, and a stator post doorway cover. It may be referred to below as a conversion kit.

BRIEF DESCRIPTION OF THE DRAWING

The figures referred to below represent several versions and elements of the preferred embodiment.

FIG. 5. Shows a view of the assembled rectifier and Stator winding.

FIG. 6–8. Show an alternate preferred embodiment.

DETAILED DESCRIPTION

Formerly two of the three bayonet connectors redundantly connected the battery to the positive plate of the old style rectifier and one which connected to the stator terminal. In other words, though there appeared to be three connections, 2 of the three bayonet connectors were connecting the positive plate (of the old style rectifier) to the battery and one was for the stator tap. So in reality there were only two connections.

Figure 1:
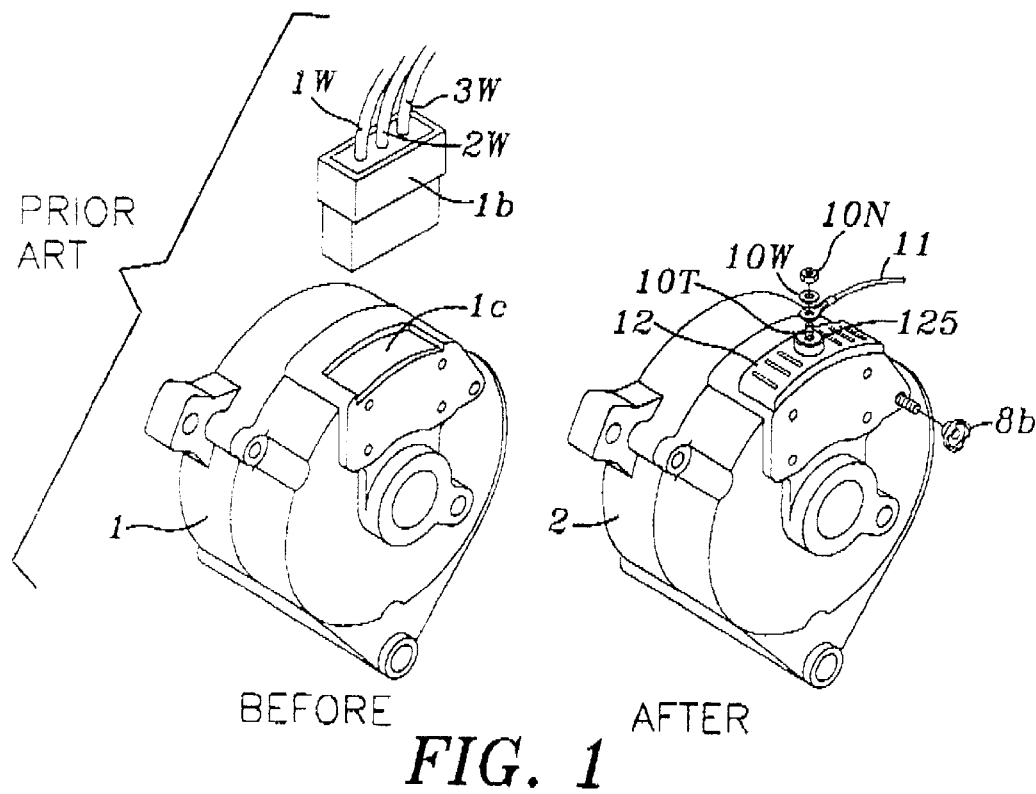
FIG. 1. Shows two comparison "before" with an "X" drawn through it, and "after" illustrations of the main piece.

Referring to the drawings in detail, there is shown in FIGS. 1 through FIG. 4, various views cooperating parts which may be used separately or together to create a means for converting the electrical terminals on old style Ford alternators from bayonet style to nut and bolt and eyelet style. Items 1 and 2 of FIG. 1 show before, 1, and after, 2, of pre and post converted old style Ford alternator. The multiple bayonet connector 1*b*as shown in FIG. 1, is as a secondary result of the conversion done away with; eyelets being placed on the ends of wires which formerly had multiple female bayonet connectors. It is important to note that formerly two of the three wires 1w, 2w, and 3w as shown in FIG. 1 of the bayonet connectors redundantly connected the positive terminal of the vehicles battery to the positive plate of the old style rectifier. Hereafter these 2 wires may be referred to as battery charging wires. The third wire in the group, terminating in a bayonet connector, connects the regulator to the stator terminal, also called a stator tap. In other words, though there appears to be three connections, 2 of the three bayonet connectors redundantly connect the positive plate (of the old style rectifier) to the battery positive terminal and one is for connecting the regulator to the stator tap. So in reality there are only two connections: a battery positive terminal connection and an regulator connection.

Figure 2:
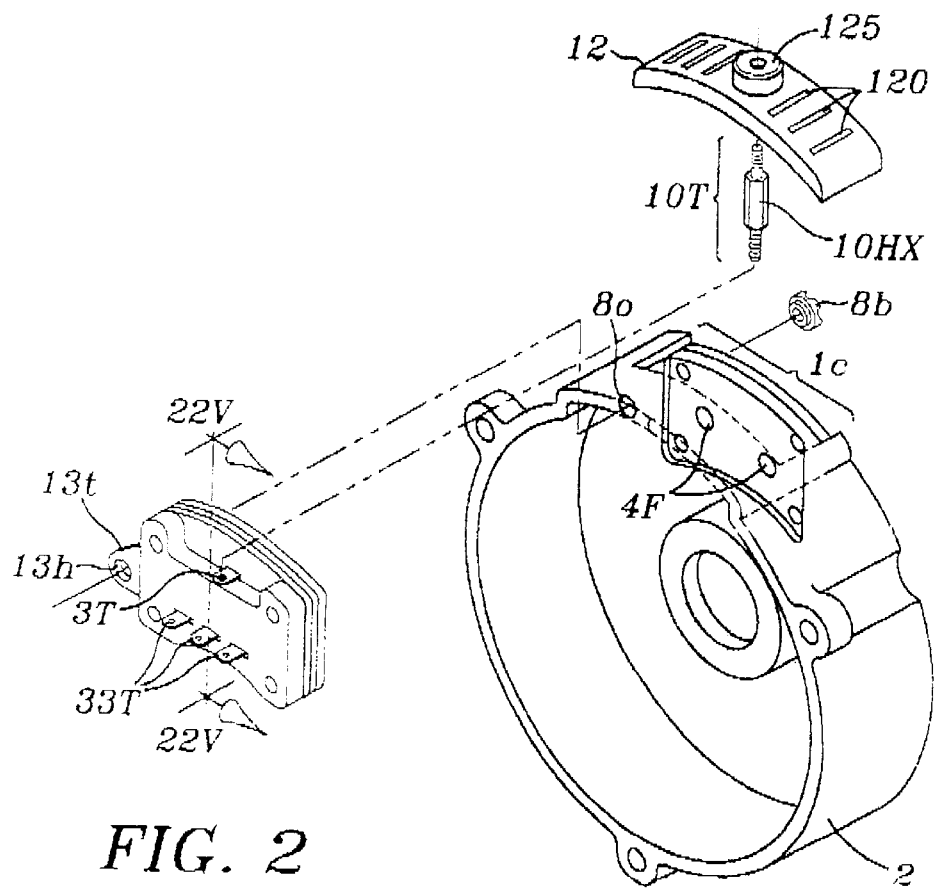
FIG. 2. Shows how the modified rectifier and the stator terminal post and doorway cover are assembled FIG. 3. Shows a view of the battery terminal bolt and insulating internal and external washers as assembled through the wall of the alternator frame.

To create a conversion of a Ford alternator from a bayonet style to an eyelet-nut-and-bolt style alternator, begin by taking an open split ring end old style Ford alternator frame which has a rectifier aligning cavity, 2g as shown in FIG. 2, known as original equipment manufacturer part no. E6FZ-10333A, GH 369 S.R.E. frame, hereafter Ford frame.

The Ford frame has a doorway, 1c as shown in FIG. 1, formerly used to provide an opening for the bayonet connector, 1b as shown in FIG. 1, to be pushed through and connect with the mating bayonet connector of the Ford rectifier assembly, It is through this opening or doorway that a stator connecting post terminal 10t as shown in FIGS. 1 and 2 is screwed into the middle terminal base 3t as shown in FIG. 2, of the modified rectifier, fastening the diode connectors and providing means for the external connection of bolt and eyelet and nut to be used to connect to the stator middle terminal, 3t as shown in FIG. 2, on the terminal block. The stator post terminal is a special bolt 10t as shown in FIG. 1, having a hexagonal midsection being from about ⅝ to 1 inch long and ⅜ inch wrench size diameter and having a ⅛th inch diameter bolt segment protruding from the center of the ends of the hexagonal portion, 10hx as shown in FIG. 2.

Figure 3:
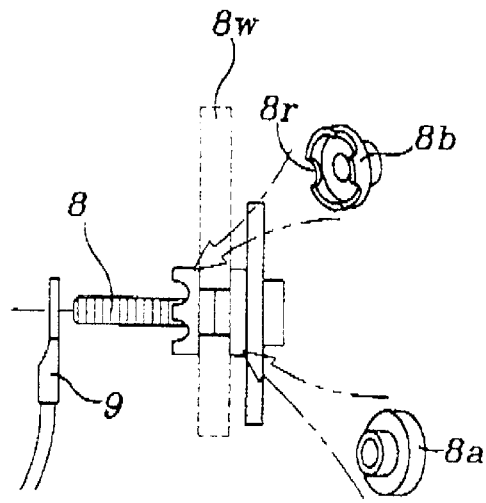
Figure 4:
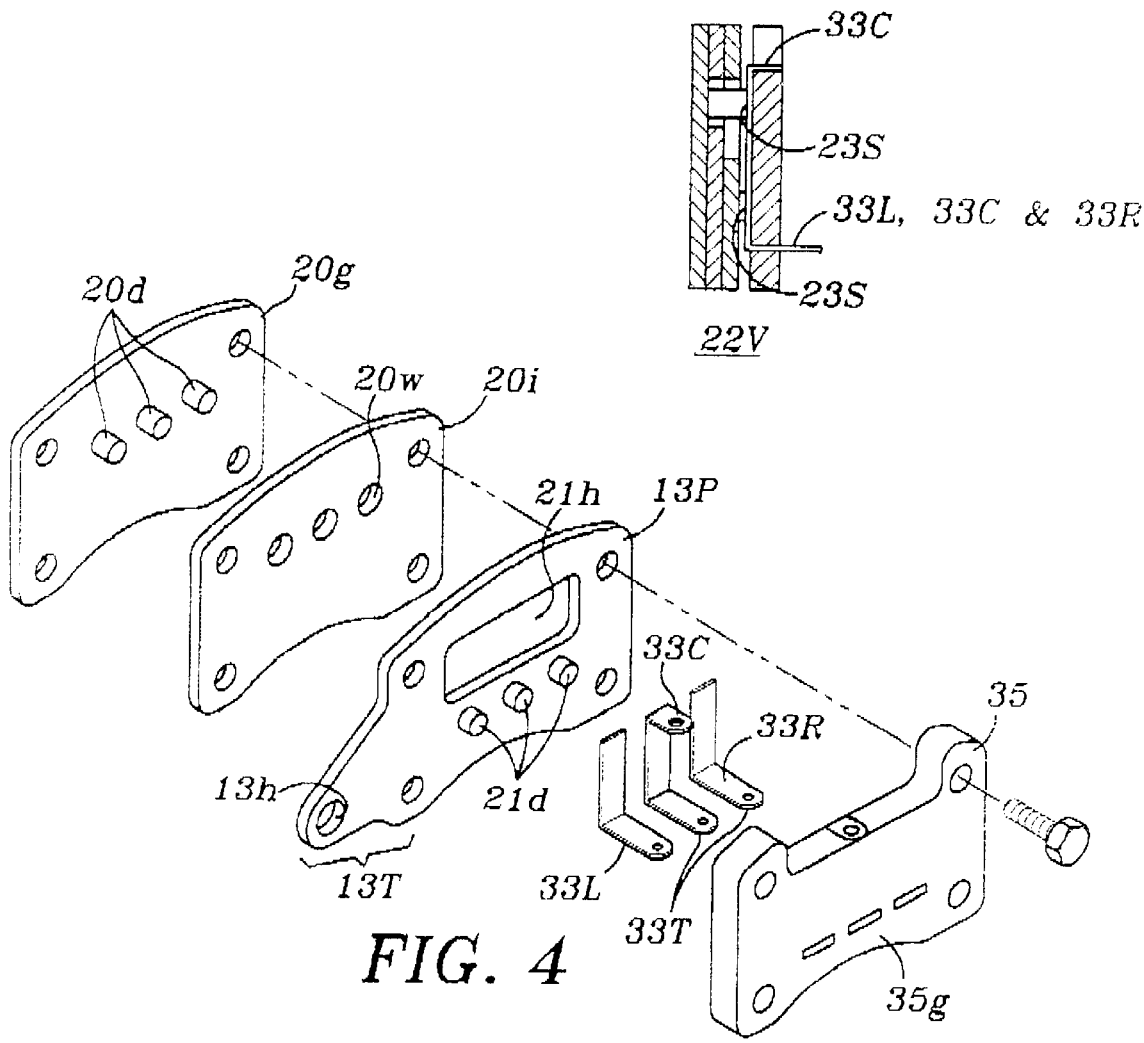
FIG. 4. Shows an exploded view of the preferred embodiment.

Prior to the stator post being connected however, and prior to the stator rectifier unit being joined to the Ford frame, the rectifier is connected to the stator by the soldering of the three stator field winding leads to the terminal bases at each field terminal, 91 as shown in FIG. 5, and an insulating washer-spacer 8a as shown in FIG. 3, being about ⅝ths inch diameter having a concentrically aligned insulating tube segment protruding about ⅛th inch and a flange base thickness of about ⅛th inch and having a ¼ inch hole disposed through the center of both the flange and tube segment is placed into the battery terminal hole of the Ford Frame, 8a as shown in FIG. 3. This washer-spacer allows the battery terminal bolt, 8 as shown in FIG. 3, to be tightened without causing the positive plate, 13p as shown in FIG. 4, of the rectifier assembly to be bent or cause the assembly to become misaligned with the ground plate cavity in the base of the Ford frame; yet the battery bolt doubly acts as an anchoring bolt to hold down the rectifier assembly to the frame and may facilitate the reassembly of the alternator. This is discussed further below.

The central diode connector is affixed to the central terminal base by a stator terminal post connector 10t as shown in FIG. 2, but is mounted thereto after the terminal block has been mounted to the Ford alternator frame. Then the stator connecting post and a stator post doorway cover, 12 as shown in FIG. 1, are mounted to the rectifier assembly from outside of the Ford alternator frame. The insulating vented stator post doorway cover is attached, hereafter referred to as, cover. The cover is made of heat resistant insulating material such as high impact plastics or other same function means. It is generally a flat rectangular framus about 3 inches long and 1¼ inch wide having perforations or vents and having downward dependent legs resulting in a 2⅛ inch straddle between the legs on opposite ends of the rectangle so that the cover will snugly straddle the upwardly protruding flanges surrounding the bayonet doorway of the Ford frame and provide resistance against the cover swiveling on top of the doorway. The cover further has a shouldered screw hole, approximately centered on the rectangle, which fits down onto the screw of the stator terminal post, 12s as shown in FIGS. 1 and 2.

An external insulating washer 8r as shown in FIG. 3, is placed on the battery terminal to insulate it from grounding on the Ford frame, as shown in FIG. 3, but wherein two washers, one internal 8a, and one external 8b, both as shown in FIG. 3, each have a tube segment which butts up and meets approximately halfway through the wall of the Ford alternator frame, 8w as shown in FIG. 3, with the other washer. The external washer has a notched ridge to allow for the battery terminal eyelet to nest closely to the surface of the alternator but still be electrically insulated from it, 8r as shown in FIG. 3.

The stator/rectifier assembly is now mounted to the frame as has been the typical practice adding heat transfer compound to the ground plate and the addition of screws which mount the modified rectifier to the Ford frame.

PREFERRED EMBODIMENT FOR ARTICLE OF MANUFACTURE

In a preferred embodiment the rectifier assembly is produced as a one-main-piece body comprising essentially a reconfiguration of the shape of the aforementioned rectifier components to resemble more closely the size and shape of the original equipment Ford part no. E6DZ-10304A, GY-1360, with the exception of the added battery terminal eye tab 13 as shown in FIG. 10 and the stator terminal tap, 3t as shown in FIG. 10. For reference purposes the rectifier assembly has a roughly rectangular curved base plate, 20g as shown in FIG. 4, curved downward on the ends of its horizontal centerline, with four mounting screw holes near the four corners of the base plate. The base plate has an imaginary vertical centerline running from its top edge top to its bottom edge and stacked on top of the base plate are a first row of diodes a gasket, a positive plate, another row of diodes on the positive plate and three side by side bayonet connectors which are covered by an insulating mounting terminal block. Looking down on the assembly just described. The positive plate, 13p as shown in FIG. 4, has a battery terminal tab, 13t as shown in FIG. 4, with a hole in it to the left of the assembly; the left being determined by looking at the assembly from the terminal block side. The positive plate has an imaginary curved center line corresponding to the curvature of the ground plate. The aligning ground plate 20 as shown in FIG. 4, which would also act as a negative diode mounting plate, has a horizontal row of three diodes mounted to it side by side between the top two mounting holes of the aligning ground plate, 20d as shown in FIG. 4. A insulator gasket, 20i as shown in FIG. 4, or tape is placed directly on the surface of the ground plate having holes in it so as not to interfere with the diodes on the ground plate, 20w as shown in FIG. 4.

A positive plate further comprising the same shape of the base plate with the addition of a shaped battery terminal tab protruding from the left side of the positive plate being about ½ inch in height by ¾ inch in width and having a ⅜ inch hole in it, 13*h* as shown in FIG. 4, centered about ½ inch below and ½ inch to the left of the upper right hand mounting screw hole of the ground. The hole is made so as to concentrically align with a hole which exists on Ford alternator frames former battery post terminal hole, 8*o* as shown in FIG. 2. The positive plate further has a spacing gap, 21*h* as shown in FIG. 4, or gaps above its horizontal center line corresponding to the row of diodes disposed on said base plate, so that the positive plate may be placed flatly onto the gasket covered base plate and not come in contact with the first row of diodes.

A second horizontal row of diodes of identical size and shapes of the first row is located on the positive plate just below the horizontal centerline so that the diodes are forward mode biased in the direction leading from the exposed second row diode terminals to the gasket side of the positive plate, and they are further arranged so as to be vertically aligned with the diodes in the first row in three pairs of two. As shown in cross-section view 22*v* of FIG. 4 which is cross referenced at FIG. 2, all three stator field winding connectors, which also connect the vertically aligned diode pairs culminate into connection with only one stator tap, 33*c* as shown in FIG. 4.

The left and right diode connectors 33*l* and 33*r* as shown in FIG. 4, with bayonet tabs further comprise an "L" shaped approximately 3/16 inch wide flat strip of metal being placed on said diodes so that the first diode connector vertical portion contacts and connects the two diodes exposed terminals now located in a vertical row on the extreme left of the two horizontal rows of diodes and the horizontal portion of said connector being a bayonet tab portion protruding outward and away from said front side of said positive plate; providing means for connecting the stator terminals thereto, further all of the connectors are made of iron steel or copper or brass.

The "C" shaped diode connector, 33*c* as shown in FIG. 4 with bayonet tab being placed on the center vertical row of diodes also with its bayonet tab protruding outward and away from the front side of said positive plate also connects both diodes exposed terminals in the center vertical row of diode pairs and the top horizontal portion of said "C" shape is a stator tap and is perforated to accept a Stator post terminal. Since all of the diodes are-mounted to either the positive or the negative plate, all diodes are connected to this diode connector.

An insulating cover 35 as shown in FIG. 4, further comprising a ceramic or plastic moldable insulating plastic cover which is disposed onto the assembled aforementioned parts surface leaving the battery terminal tab and the three bayonet connectors, the stator tap and the back surface exposed and un-insulated.

Two "L" shaped bayonet leg connectors are soldered to the terminals of the diode pairs at the opposite ends of the diode rows in vertical pairs so that a rectifier bridge is created at each connected pair of diodes as indicated by 23*s* of the cross sectional view 22*v* of FIG. 4. The center diode has a "C" shaped bayonet leg connector, 33*c* as shown in FIG. 4 in order to provide a base for connecting the stator post terminal tap to. The three 3/16th inch wide bayonet connectors are spaced apart about ½ inch at their centers and when fully assembled the bayonet connectors protrude from the surface about 5/16 inch and are within tolerable reach of the field winding leads of the stator. These leg connectors are field terminals for connecting the stator field windings to.

This assembly is followed by a coating of ceramic and plastic insulation or other insulation means such as a gasket. Connectors from the diodes to the mounting terminals are isolated from each other within the mounting block The terminals provide bayonet tab portion means, 33*t* as shown in FIG. 2, for connecting the alternator stator terminals thereto such as a soldering lug having a male bayonet connector shape. The mounting terminals provide a base for connecting the diode lead electrodes thereto as in FIG. 10. The positive diode mounting plate extending in shape beyond the limits of the breadth of the ground plate so as to provide a connecting tab, 13 as in FIG. 10, from the positive plate to the area of the a Ford alternator frame wherein there is a hole formerly used as the battery connecting post terminal of the alternator, having the output or battery terminal connecting bolt mounting hole already pre-drilled. The stator post terminal and the battery terminal connecting bolt being separately provided within the repair kit however not installed onto the main piece.

The ground plate may have all four original mounting screw holes drilled or it may be made with only one; being the one most nearly opposite of the battery connecting terminal. Being at near opposite extremes of the mounting plate, the tightening of the battery terminal and one opposite screw on the ground plate would suffice to provide sufficient grounding contact to effect the grounding of the rectifier to the alternator frame.

In other words the battery bolt doubly acts as an anchoring bolt to hold down the rectifier assembly to the frame and may thus expedite and/or facilitate the reassembly of the alternator. Then, how ever many other screws as is felt are necessary may be added to fasten the ground plate by its original screw down design.

PREFERRED EMBODIMENT FOR METHOD

Beginning with an open slip ring end old style Ford alternator frame having the stator field winding and the bayonet style connector rectifier in place, the following steps will suffice to convert the alternator to a conventional eyelet nut and bolt style connector rectifier:

Step 1. remove the screws holding the stator field in place;
Step 2. remove the four screws holding the rectifier mounted to the inside rear wall of the alternator frame;
Step 3. de-solder or otherwise remove the bayonet style rectifier from the three field winding leads;
Step 4. solder a modified rectifier assembly as herein previously described; having means for nut eyelet and bolt style connection to the battery and stator connectors which use existing access holes and doorways within the Ford alternator frame;
Step 5. insert a battery terminal bolt through the battery terminal eyelet tab on the rectifier assembly and place an insulating internal spacer-washer on the battery terminal bolt;
Step 6. re-assemble the stator-rectifier assembly to the Ford frame;

What is claimed is:

1. A kit for modifying an automobile alternator of the type having bayonet electrical wiring connectors being commonly described as internal alternator regulator, known as IAR, style alternators having a integral alternator/regulator which is electrically connected to a battery of the automobile via a multiple bayonet connector and having a slip ring end frame; the frame has an approximately rectangular baseplate cavity used to receive, align and secure a rectifier assembly thereto and a bayonet connector doorway and a battery terminal bolt hole to one side of the baseplate cavity; the kit for modifying an automobile alternator comprising:

a modified rectifier assembly;

a terminal block;

a stator connecting post;

a battery terminal bolt;

a vented doorway cover;

a ground base plate; and, an internal and an external insulating spacer-washers;

wherein the modified rectifier assembly comprising: a negative diode base plate, having a diode side and a ground side; an electrically insulating gasket disposed on the diode side of the negative base plate; a positive diode base plate also having a diode side and a ground side; the modified rectifier's positive base plate and the negative base plate are stacked on top of one another with the insulating gasket therebetween; six diodes configured onto the aforementioned two base plates in an electrical rectifying bridge configuration via connectors; the modified rectifier further includes a left-hand side and a right-hand side, when looking at the diode side of the plates; a battery terminal eye tab for receiving a battery bolt therethrough;

the ground base plate being an approximately 1/8th inch thick aluminum plate being as same shape as a baseplate cavity in the alternator so that the modified rectifier's battery terminal bolt hole aligns with the battery terminal bolt hole of the frame and rests flatly on the ground plate;

the insulating internal spacer washer and the insulating external spacer washer for insulating the battery terminal bolt when it is inserted through the wall of the frame where the battery terminal bolt hole is located;

the insulating vented stator post doorway cover for covering a doorway formerly used for the bayonet connector; the doorway cover is made of heat resistant insulating material, whereby the doorway cover is generally a flat rectangular framus about 3 inches long and 1¼ inch wide having perforations or vents and having downward dependent legs resulting in a 2⅞ inch straddle between the legs on opposite ends of the rectangle so that the cover will snugly straddle the upwardly protruding flanges surrounding the bayonet doorway of the frame and provide resistance against the cover swiveling on top of the doorway;

the stator connecting post being a terminal bolt having a length from about ⅝ to 1 inch long and having a 1/8th inch diameter bolt segment protruding from the center of the ends of the hexagonal portion.

2. A kit for modifying an automobile alternator of the type having bayonet electrical wiring connectors being commonly described as internal alternator regulator, known as IAR, style alternators having a integral alternator/regulator which is electrically connected to a battery of the automobile via a multiple bayonet connector and having a slip ring end frame; the frame has an approximately rectangular baseplate cavity used to receive, align and secure a rectifier assembly thereto and a bayonet connector doorway and a battery terminal bolt hole to one side of the baseplate cavity; the kit for modifying an automobile alternator comprising:

a modified rectifier assembly;

a terminal block;

a stator connecting post;

a battery terminal bolt;

a vented doorway cover;

a ground base plate; and, an internal and an external insulating spacer-washers;

wherein the modified rectifier assembly comprising: a negative diode base plate, having a diode side and a ground side; an electrically insulating gasket disposed on the diode side of the negative base plate; a positive diode base plate also having a diode side and a ground side; the modified rectifier's positive base plate and the negative base plate are stacked on top of one another with the insulating gasket therebetween; six diodes configured onto the aforementioned two base plates in an electrical rectifying bridge configuration via connectors; the modified rectifier further includes a left-hand side and a right-hand side, when looking at the diode side of the plates; a battery terminal eye tab for receiving a battery bolt therethrough;

the ground base plate being an approximately 1/8th inch thick aluminum plate being as same shape as a baseplate cavity in the alternator so that the modified rectifier's battery terminal bolt hole aligns with the battery terminal bolt hole of the frame and rests flatly on the ground plate;

the insulating internal spacer washer and the insulating external spacer washer for insulating the battery terminal bolt when it is inserted through the wall of the frame where the battery terminal bolt hole is located.

* * * * *